United States Patent [19]

Feng

[11] Patent Number: 5,470,122
[45] Date of Patent: Nov. 28, 1995

[54] EXTENSION UNIT FOR SUN VISOR

[76] Inventor: Henry Feng, 1208 E. 24th St., Oakland, Calif. 94606

[21] Appl. No.: 17,774

[22] Filed: Feb. 16, 1993

[51] Int. Cl.⁶ ........................................ B60J 3/02
[52] U.S. Cl. .................. 296/97.6; 296/97.8; 296/97.11
[58] Field of Search .................. 296/97.6, 97.8, 296/97.11, 97.12

[56] References Cited

U.S. PATENT DOCUMENTS

| | | | |
|---|---|---|---|
| 3,534,999 | 8/1970 | Kessebring | 296/97.6 |
| 3,545,805 | 10/1970 | Wilson | 296/97.6 |
| 3,853,370 | 12/1974 | Barnhart | 296/97.6 |
| 3,954,297 | 4/1976 | Linke et al. | 296/97 C |
| 4,248,474 | 5/1981 | Mandrick | 296/97 G |
| 4,635,995 | 11/1987 | Mineck | 296/97 G |
| 4,690,451 | 9/1987 | Killar | 296/97.8 |
| 4,728,142 | 5/1988 | Gavagan | 296/97.8 |
| 4,736,979 | 3/1988 | Harvey | 296/97 G |
| 4,792,176 | 6/1988 | Karford | 296/97.8 |
| 4,848,822 | 4/1989 | Da Costa | 296/97.8 |
| 4,925,233 | 5/1990 | Clark | 296/97.11 |
| 5,016,937 | 5/1991 | Tschan | 296/97.8 |
| 5,044,685 | 9/1991 | Yang | 296/97.6 |
| 5,112,096 | 2/1992 | Keenan | 296/97.6 |
| 5,259,657 | 11/1993 | Arendt et al. | 296/97.6 |

*Primary Examiner*—David M. Mitchell

[57] ABSTRACT

An improved releasable extension unit of a sun visor has been invented to reduce glare and to provide a better shading means for a driver and a front seat passenger in a motor vehicle. The unit is comprised of two interconnected panels and a base clamping unit of C-shaped cross section. The unit is mounted on the visor by hooking the clamping unit to the top edge of the visor. The upper panel can be moved laterally on the clamping unit. The lower panel is like an extension of upper panel. When the upper panel moves, it carries the lower panel along. The lower panel can be moved vertically with respect to the upper panel. These panels can be extended alone or in combination to provide necessary additional blocking of sun rays coming through the windshield or a front side window of the motor vehicle.

7 Claims, 4 Drawing Sheets

FIG. 3B (A-A SECTION)

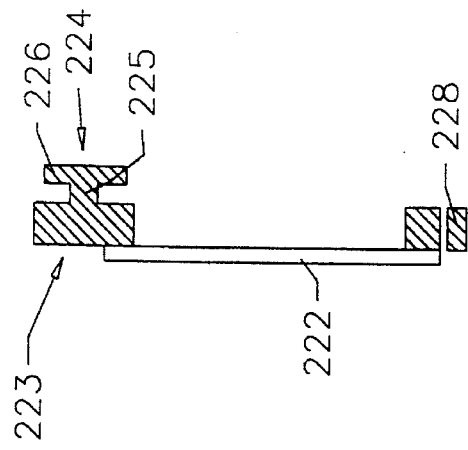
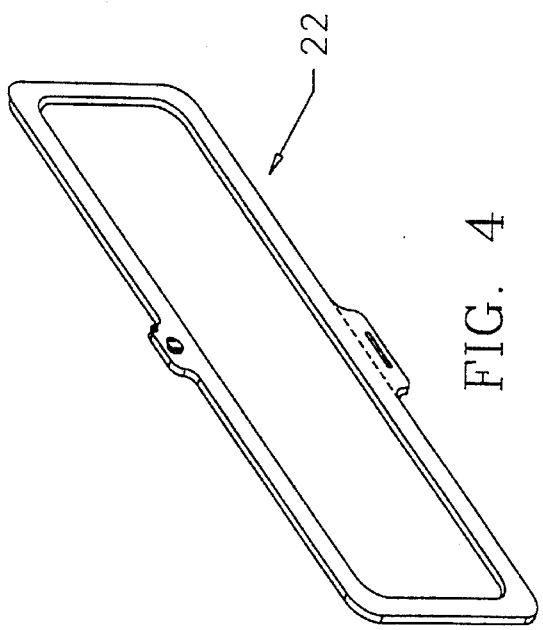
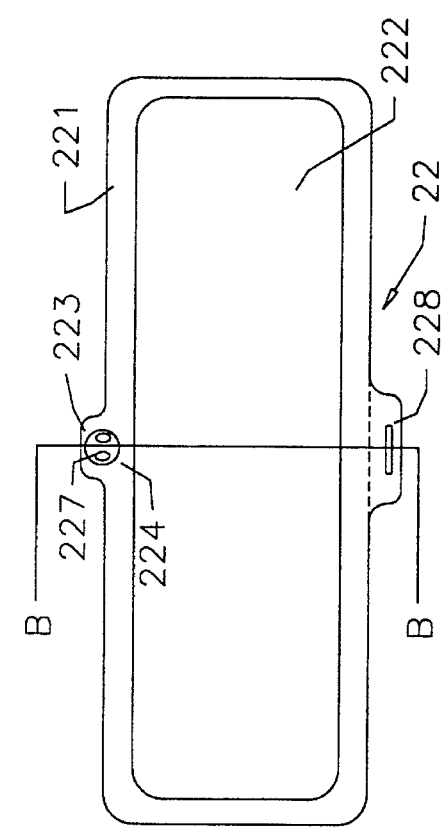
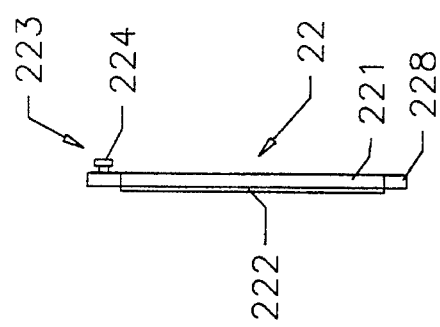

EXTENSION UNIT FOR SUN VISOR

BACKGROUND—FIELD OF INVENTION

This invention relates to a sun visor extension unit of a motor vehicle, specifically to a releasable extension unit which can be attached to a sun visor of a motor vehicle.

BACKGROUND—DESCRIPTION OF PRIOR ARTS

Most conventional sun visors for motor vehicles consist of a single panel. Such a sun visor can be pivoted to a position which prevents some of the sun rays from reaching the eyes of a driver or a front seat passenger in the vehicle However, when the sun is at some particular angles, such as in the morning and the late afternoon, the conventional sun visor is too small to effectively block the rays from coming through a front side window. Part of the head and the face of the driver or the front seat passenger is exposed to the hot sun, which is uncomfortable. Many earlier devices have provided extensions to make better use of a conventional sun visor. In general, three different approaches have been taken.

1. a pull-out extension stored inside the conventional sun visor.
2. a window blind mounted or attached to the top of a side window or on the conventional sun visor.
3. a releasable extension attached to the conventional visor as an after-market product.

It is preferable to have a sun visor which includes an extension stored inside it. However, it is too expensive to replace a conventional one-panel sun visor with a new improved sun visor. A window blind provides better coverage than a conventional sun visor for the side window, but attaching such a device to a car window does not allow the window glass to be lowered. Therefore, an extension unit which can be securely attached to the conventional sun visor is the best and most convenient choice for the least cost.

Unfortunately, most after-market extension units have been bulky and inefficient. These extensions were designed mainly to protect the driver's or passenger's eyes. Most of these earlier devices have only a single panel; others have multiple separate panels. So earlier devices could not be used effectively to protect the head and the face of the driver and the front seat passenger from the sun rays which come through side windows.

SUMMARY OF THE INVENTION

The present invention provides a releasable extension device which can be attached to a conventional sun visor to reduce sun glare more effectively. The extension unit is comprised of a base clamping unit for attaching the whole extension unit on a conventional sun visor and two interconnected panels. The panels can be extended to block some substantial gaps or space missed by the conventional sun visor. The advantages of the present invention of the sun visor extension unit are:

1. It blocks sun rays coming through a side window or the upper corner of the windshield better than most other releasable extensions of earlier design.
2. It does not interfere with normal operation of the sun visor; when the sun visor is raised to its stored position, the extension unit is hidden.
3. It is safe to store in the sun visor;.
4. It is easy to manufacture.
5. It can be attached securely, while remaining easily releasable from the sun visor;
6. It is easy to operate.

BRIEF DESCRIPTION OF THE DRAWINGS

All figures are not in true scale for clarity,

FIG. 3B is a section view of A—A of fig,3,

FIG. 4 is an isometric view of a frame of a lower panel of the extension unit,

FIG. 4A is a front view of FIG. 4,

FIG. 4B is a section view of B—B of FIG. 4,

FIG. 4C is a side view of FIG. 4 with a tinted screen attached.

DESCRIPTION OF THE PREFERRED EMBODIMENT

Figure 1:
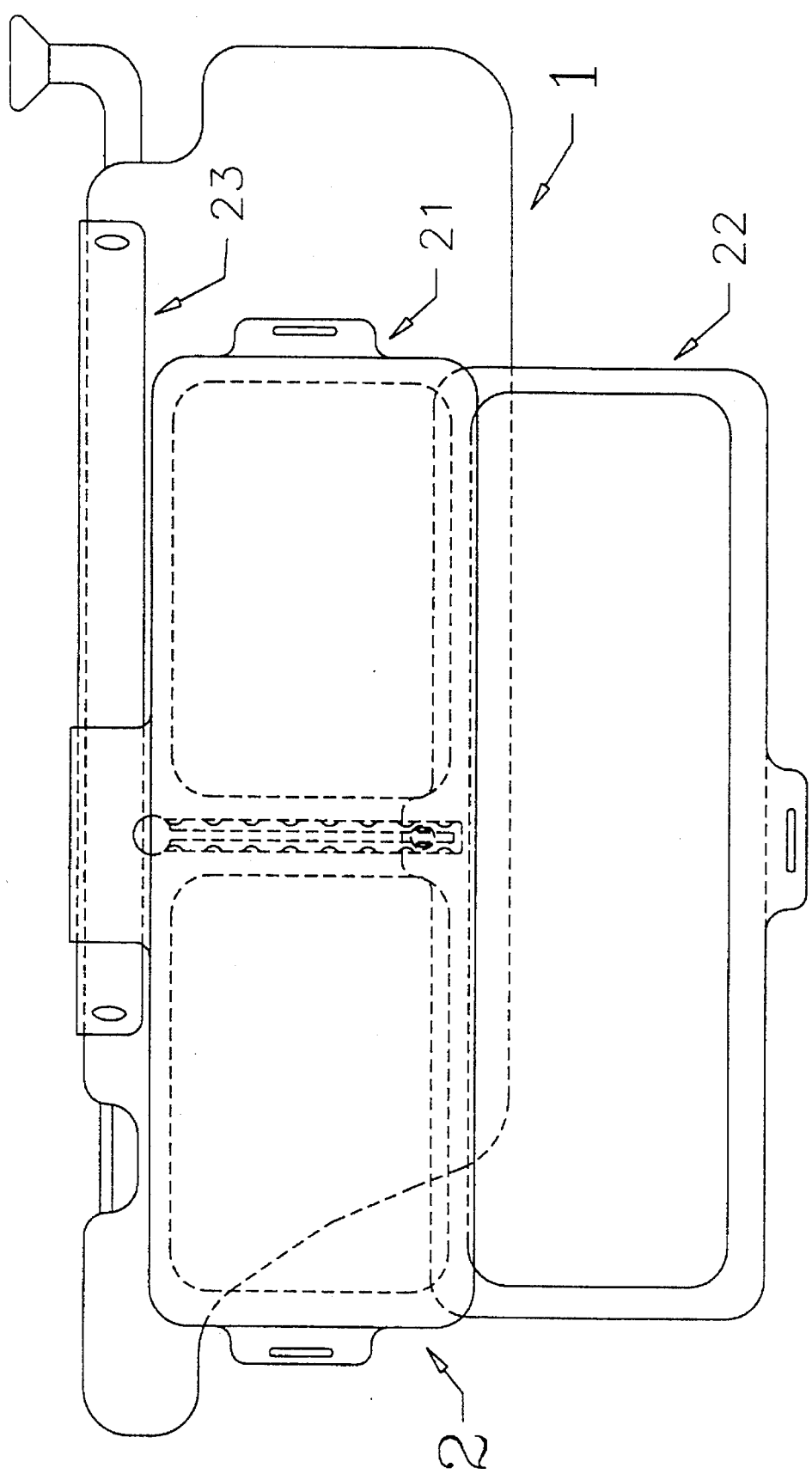
FIG. 1 is a front view elevation illustrating the preferred form of sun visor extension of the present invention in assembled relation to a conventional sun visor of a motor vehicle.

Shown in FIG. 1 is a conventional sun visor 1 carrying the present invention of the sun visor extension unit 2. The extension unit is comprised of a base clamping unit 23, a upper panel 21, and a lower panel 22. Clamp unit 23 is hooked on the top of sun visor 1 to connect extension unit 2 to visor 1. Panel 21 is then hooked on the top of clamp unit 23. Panel 22 is engaged with panel A 21. Panel B 22 is like an extension of panel A 21.

Figure 2A:
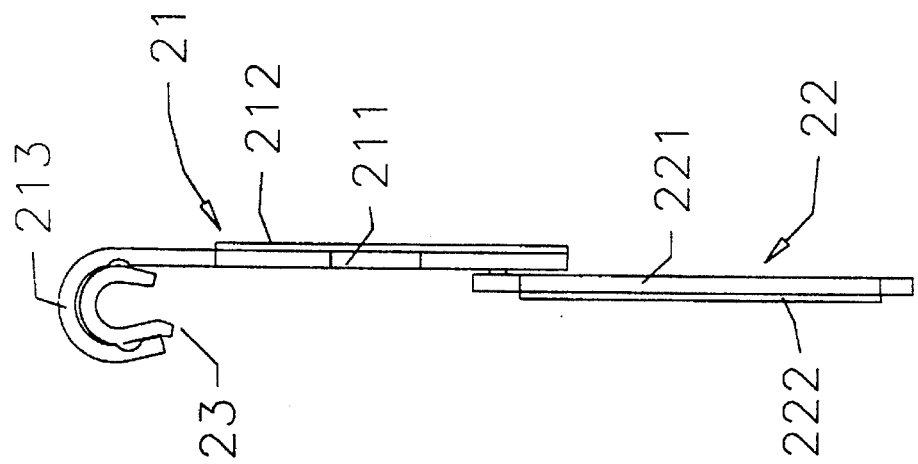
FIG. 2A is a side view of FIG. 2.
Figure 2:
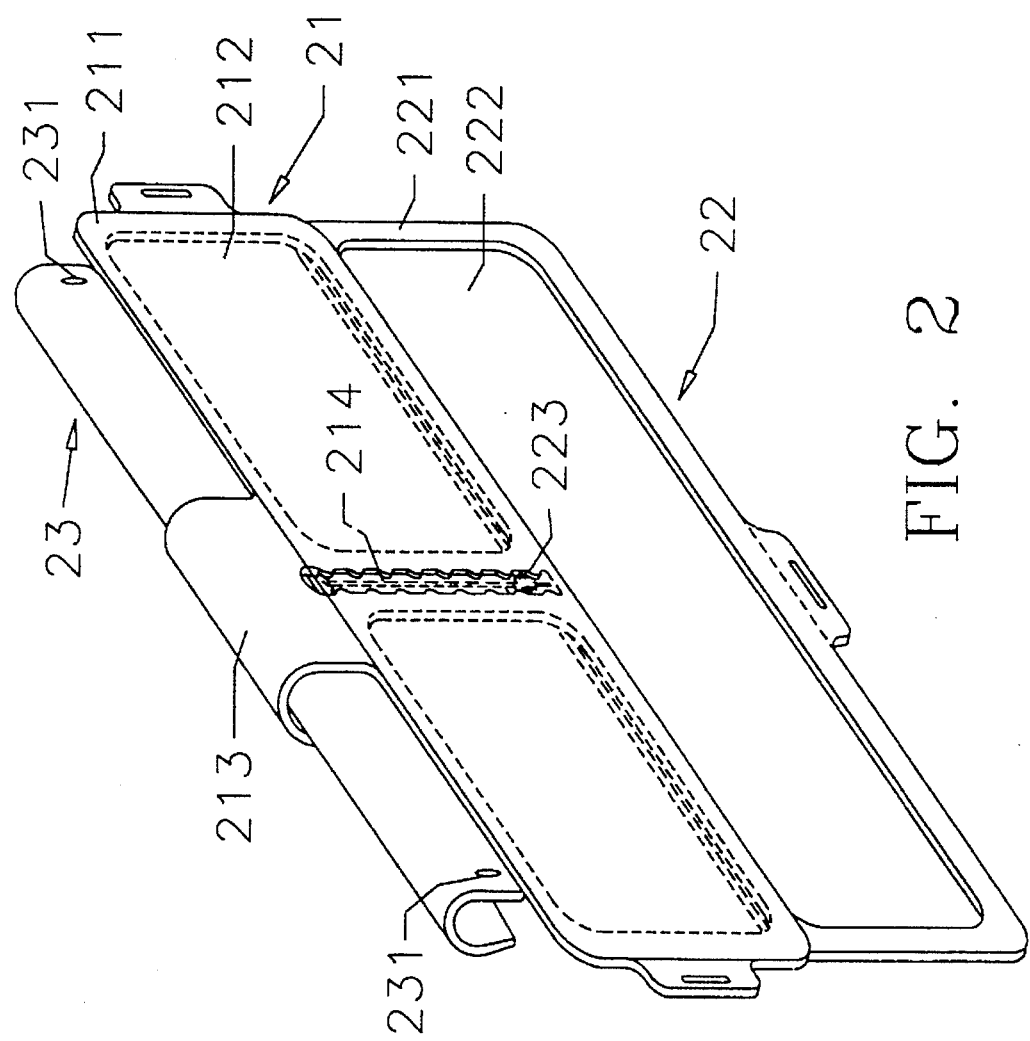
FIG. 2 is an isometric view of the extension unit.

To discuss the connections between the parts of extension unit 2, refer to FIG. 2, and FIG. 2A first, A clamping flange 213 of a frame 211 of panel 21 is hooked on top of the base clamping unit 23. Panel 21 then can be easily moved laterally on the smooth, rigid surface of clamping unit 23.. Near both ends of clamping unit 23, two small extrusion means 231 keep panel 21 from sliding off clamping unit 23.

Figure 3C:
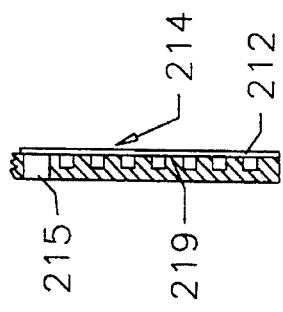
FIG. 3C is a side view of FIG. 3 with a tinted screen attached.
Figure 3C:
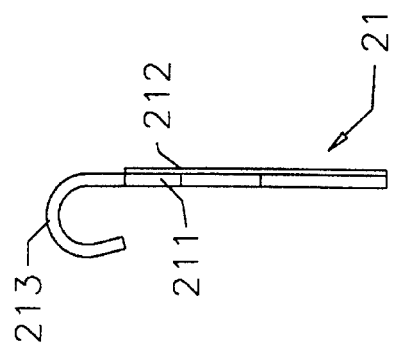
Figure 3:
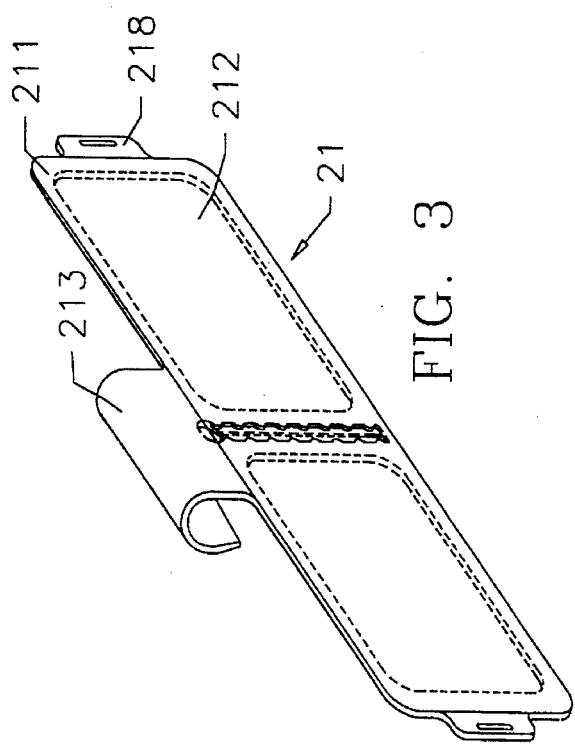
FIG. 3 is an isometric view of a frame of a upper panel of the extension unit.
Figure 3A:
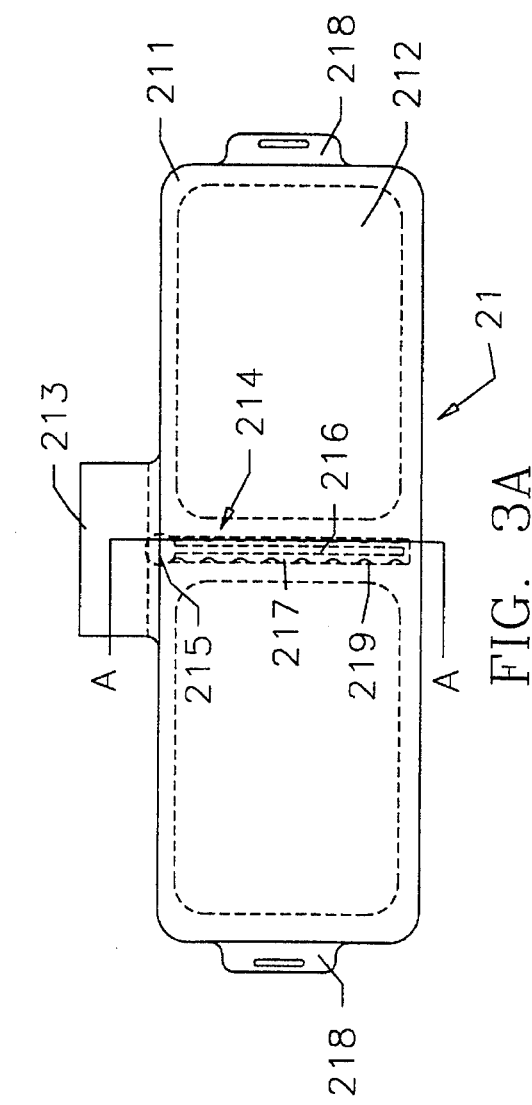
FIG. 3A is a front view of FIG. 3.

In FIG. 3, FIG. 3A, and FIG. 3C, panel 21 is shown in detail. It includes two components, a frame 211 and a tinted screen 212. The clamping flange 213 is locating on the top near the center of frame 211. Frame 211 also has a guide slot 214 in the center, and tabs 218 on the left and right sides. Referring to FIG. 3A specially, guide slot 214 includes a thorough hole 215 on the top. Hole 215 is there to allow panel 22 to enter to slot 214 and also to exit slot 214. In order to keep the engaging means of panel 22 from getting off slot 214, slot 214 is formed by two conjunction slots 216, and 217. Slot 216 is narrow with flat sides. It is half the thickness of frame 211. Slot 217 is wider and two sides are edged with dull saw-tooth notches 219. It is the same thickness as slot 216. The conjunction of slot 216 and 217 is made to contain the engaging means of panel 22 without interfering the tinted screen 212 which is plating on frame 211. In addition, notches 219 are made to withhold the engaging part of panel 22 so that panel 22 can be raised and lowered easily. Frame 211 also includes: a tab 218 on the sides for easy handling.

In FIG. 4, FIG. 4A, and FIG. 4B, panel 22 is shown in detail. Panel 22 includes a frame 221 and a tinted screen 222.

A slot follower 223 is on the top of a frame 221. A pin 224 located on slot follower 223 is the engaging means for panel 22 to attach itself to panel 21. It has two parts: bolt 225 and head 226. By pushing pin 224 through hole 215 and then moving into guide 214 of panel 21, panel. 22 is joined with panel 21. Bolt 225 remains in slot 216; and head 226 remains in slot 217 respectively. Head 226 has holes 227 near the left and right sides to increase control. To pass through the saw-tooth notches of slot 217, head 226 bends inward when force is applied. Frame 221 also includes tab 228 on the bottom for easy handling.

OPERATION OF PREFERRED EMBODIMENT

After an extension unit is attached to a conventional sun visor as indicated in FIG. 1, panel 21 can be moved easily left or right by grasping either tab 218 on the sides. Because panel 21 and panel 22 are connected, when panel 21 moves, it carries panel 22 along. Panel 22 is like an extension of panel 21. It can be extended vertically with respect to panel 21 by pulling tab 225. Panel 21 and panel 22 can also be moved together by grasping tab 225. In fact, panel 21 can be extended left or right to block the upper gaps between the side edge of the windshield and visor 1, and between visor 1 and the rear view mirror. If space below the sun visor needs to be blocked, panel 22 can be pulled down. By moving both panels to a proper position, sun rays which would come through the side window can be effectively blocked.

CONCLUSION, RAMIFICATIONS, AND SCOPE

The material for the present invention of an extension unit of a sun visor should include two types of plastics. The :tinted screens should be made of soft plastic film. The clamp unit, frames 211 and 222 should be made of flexible plastics in order to be easily controlled and provide safety. The extension unit has no sharp edges or loose parts and bends easily. Generally, clamp unit 23, frame 211, and frame 222 are made from injection molding. Screen 212, and screen 224 are cut from plastic film and are adhered to frame 211 and frame 222 respectively by adhesive means.

The most important alternative to the present extension unit of a sun visor is the application of the same idea to make a new sun visor which can be adjusted horizontally and has a vertical adjustable extension.

In order to provide different degrees of shading, a third panel can be added to the opposite side of panel 22. Another modification would be to take advantage of the smooth surfaces of panel 21 and panel 22, by adding screens by releasable adhesive means.

In conclusion, the present invention of an extension unit of a sun visor includes a novel method of combining the frame and screen together as a panel for safety and good control. It includes a frictional method of joining the panels together and a unique method of moving a panel in a lateral direction on the smooth surface of a clamp instead of on the sun visor surface. Thus, labor and material to build a housing to contain a panel is saved. In conclusion, this invention provides means to overcome the shortcomings of the conventional sun visor and to reduce glare more effectively.

Based on the above description, What is claimed is:

1. A releasable extension unit which is attached to a sun visor of a motor vehicle to reduce glare more effectively and to use as a shading means on a front side window comprising: an elongate member of a generally C-shaped cross-section having a smooth exterior surface mounted on the upper edge of the sun visor and a first panel which has clamping means provided on one edge portion thereof for mating slidable engagement with said elongate member whereby said first panel can be adjusted in the horizontal direction; said first panel having vertically extending slot means for connecting a second panel, said second panel having pin means for frictional engagement with said slot means, whereby said second panel can be vertically adjustably positioned relative to said first panel.

2. The device of claim 1 wherein said first panel and said second panel are both comprised of a frame and a tinted screen whereby said frames are made of flexible plastics for good controllability in operation, and said screens which are attached to said frames have similar configuration with respect to the frames.

3. The device of claim 2 wherein said first panel has a single guide slot in the center of said frame of said first panel, whereby said slot means includes a through hole on the top, where by said second panel can be either joined or taken off from said first panel through said hole.

4. The device of claim 3 wherein said slot is formed by two different width slots: a lower slot which has smaller width, and upper slot has wider width.

5. The device of claim 2 wherein said second panel has pin means on the top edge of said frame of said second panel, whereby the head and bolt of said pin means are frictionally engaged with said lower and upper slots of said guide slot of said first panel respectively.

6. The device of claim 2 wherein said frame of said first panel has tabs on the left and right sides for easy handling, and said frame of second panel has tab on the bottom side for easy handling.

7. The device of claim 1 wherein said elongate member is comprised of blocking means near both ends to keep said first panel from sliding off said elongate member.

* * * * *